United States Patent
Sugio et al.

(10) Patent No.: US 8,117,813 B2
(45) Date of Patent: Feb. 21, 2012

(54) RIDING TYPE GRASS MOWER HAVING A REAR-DISCHARGE TYPE MOWER UNIT

(75) Inventors: Akihito Sugio, Kakogawa (JP); Osami Fujiwara, Kishiwada (JP); Yusuke Shoji, Sakai (JP); Yoshihiro Ueda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/871,992

(22) Filed: Aug. 31, 2010

(65) Prior Publication Data

US 2011/0131942 A1    Jun. 9, 2011

(30) Foreign Application Priority Data

Dec. 7, 2009 (JP) ................................. 2009-277960

(51) Int. Cl.
*A01D 67/00* (2006.01)
(52) U.S. Cl. ........................................................ 56/320.2
(58) Field of Classification Search ............... 56/16.8, 56/189, 320.1, 320.2, DIG. 5, 192
See application file for complete search history.

(56) References Cited

U.S. PATENT DOCUMENTS

| | | | |
|---|---|---|---|
| 3,461,654 A * | 8/1969 | Plamper .......................... 56/11.6 |
| 3,525,548 A * | 8/1970 | Mutka ........................... 296/35.1 |
| 4,916,887 A * | 4/1990 | Mullet et al. ..................... 56/13.8 |
| 4,999,984 A * | 3/1991 | Pelletier ........................ 56/249.5 |
| 5,457,947 A | 10/1995 | Samejima et al. |
| 5,826,416 A * | 10/1998 | Sugden et al. ................. 56/320.2 |
| 5,913,802 A * | 6/1999 | Mullet et al. ..................... 56/10.8 |
| 6,101,794 A * | 8/2000 | Christopherson et al. ........... 56/6 |
| 6,189,305 B1 * | 2/2001 | Wright et al. ................... 56/14.7 |
| 6,330,783 B2 * | 12/2001 | Oxley ............................ 56/320.2 |
| 6,672,043 B2 * | 1/2004 | Shibata et al. .................. 56/202 |
| 7,527,298 B2 * | 5/2009 | Tsuchihashi et al. ........... 280/847 |
| 2007/0068133 A1 | 3/2007 | Kure et al. |
| 2008/0072558 A1 * | 3/2008 | Tsuchihashi et al. ........... 56/14.7 |
| 2008/0264026 A1 * | 10/2008 | Ishii et al. ....................... 56/10.8 |

FOREIGN PATENT DOCUMENTS

| | | |
|---|---|---|
| JP | 6046637 A | 2/1994 |
| JP | 2007185128 A | 7/2007 |
| JP | 2008074293 A * | 4/2008 |

* cited by examiner

*Primary Examiner* — Thomas Will
*Assistant Examiner* — Joan Misa
(74) *Attorney, Agent, or Firm* — The Webb Law Firm (57) ABSTRACT

A riding type grass mower includes a right wheel and a left wheel, a rear-discharge type mower unit disposed forwardly of the right/left wheels, a driver's seat disposed between and upwardly of the right/left wheels, an engine mounted rearwardly of the driver's seat, an engine hood for covering the engine, and a restricting unit disposed rearwardly of the driver's seat and at an area downwardly of the engine hood, the restricting unit having a restricting face (including a mesh face) configured to restrict upward rising of cut grass discharged from the mower unit.

7 Claims, 6 Drawing Sheets

Fig.5 ically, the rectifier plate, preferably, includes a collision face for directing collided cut grass pieces to the lateral outer side. Some of the cut grass pieces discharged
RIDING TYPE GRASS MOWER HAVING A REAR-DISCHARGE TYPE MOWER UNIT

BACKGROUND OF THE INVENTION

1. Field of the Invention

The present invention relates to a riding type grass mower having a rear-discharge type mower unit configured to discharge cut grass rearward through a rear end opening.

2. Description of the Related Art

A riding type grass mower having a rear-discharge type mower unit configured to discharge cut grass rearward through a rear end opening is known from e.g. JP 6-046637 A (see FIG. 5), which discloses a mid-mount type riding grass mower, wherein a driver's seat is provided upwardly of right/left drive rear wheels and a rear-discharge type mower unit is mounted between right/left front wheels positioned forwardly of the driver's seat and the rear wheels. With this riding type grass mower, as the driver's seat is disposed rearwardly of the rear-discharge type mower unit, there is the possibility of cut grass such as lawn, dust or the like being blown up to fall onto the driver when the wind is weak or the wind is blowing against the traveling direction.

Further, from JP 2007-185128 A (see FIGS. 1 and 2), there is known a front-mount type riding grass mower wherein a rear discharge type mower unit is mounted forwardly of drive front wheels and a driver's seat is disposed upwardly of the right/left front wheels, that is, rearwardly of the rear-discharge type mower unit and an engine hood is provided immediately behind the driver's seat. With this riding grass mower, there is provided the driver's seat rearwardly of the mower unit and the engine hood is provided rearwardly of this seat. Therefore, there is the possibility of cut grass pieces or lawn being blown up and the grass pieces, dust or the like subsequently falling onto the driver or a large amount of cut grass or soil adhering to the engine hood.

SUMMARY OF THE INVENTION

An object of the present invention is to provide a riding type grass mower capable of restricting occurrence of cut grass dust or the like discharged rearward from the rear-discharge type mower unit being blown up to fall onto the driver or the cut grass, soil or the like adhering to the engine hood.

For accomplishing the above-noted object, according to the present invention, there is provided a riding type grass mower comprising:

a right wheel and a left wheel;

a rear-discharge type mower unit disposed forwardly of the right/left wheels;

a driver's seat disposed between and upwardly of the right/left wheels;

an engine mounted rearwardly of the driver's seat;

an engine hood for covering the engine; and a restricting unit disposed rearwardly of the driver's seat and at an area downwardly of the engine hood, the restricting unit having a restricting face (including a mesh face) configured to restrict upward rising of cut grass discharged from the mower unit.

Some of the cut grass pieces discharged rearward from the rear end opening of the mower unit and through between the right/left drive wheels will pass the undersides of axle cases of the right/left wheels and the engine to the rear side, and others will collide against the inner portions of the right/left wheels and bounce back therefrom to the right/left center portion of the traveling machine body, and some cut grass pieces of the like which have traveled along the inner sides of the wheels and passed the wheels to the rear side and reached the outer side from the lateral portions of the engine hood tend to soar up off the ground surface.

According to the above-described construction proposed by the present invention, such cut grass pieces or soil which have passed the wheels to the rear side and tends to soar from the lateral side of the engine hood will be prevented or restricted from soaring by the restricting unit. Therefore, it is possible to restrict occurrence of clogging due to cut grass pieces, soil or the like getting stuck to the engine hood and also to restrict subsequent falling of cut grass pieces, soil or the like onto the driver. As a result, the working environment for the worker is improved and also clogging of the engine hood can be restricted also, thus restricting interference to the cooling function for the engine. So, the operation can continue in a favorable condition for a long time.

Advantageously, said restricting face of the restricting unit comprises at least one restricting plate member. Such restricting plate member can be configured to extend over the engine hood and the outer sides of the wheels and to extend also rearward from above the rear ends of the wheels. With this, the cut grass pieces, soil or the like that have passed from the inner sides of the wheels to the lateral outer side of the engine hood are restricted from soaring above the ground by the restricting plate member and are discharged rearwardly along the engine hood. Therefore, the occurrence of clogging of the engine hood due to adhesion of cut grass pieces, soil or the like can be restricted advantageously.

Preferably, the restricting plate member includes a front portion having a horizontal face and a rear portion having an inclined face that is downwardly inclined to the rear side. With this, the cut grass pieces or soil discharged rearward from the restricting plate member will be discharged rearward obliquely downward. Therefore, the occurrence of soaring thereof up to the engine hood and the driver's seat disposed upwardly thereof can be further restricted.

According to one preferred embodiment of the present invention, the right/left wheels are right/left drive wheels, and a rear outer peripheral portion of the restricting plate member is cut away so that the restricting plate member does not project rearward from a rear borderline interconnecting the rear end of the engine hood and the outer rear ends of the rear drive wheels as seen in the plan view. With this arrangement, even when the traveling machine body is caused to make a sharp turn, before the restricting plate member collides against an object or an obstacle, the rear wheels or the engine hood will collide against the same. So, as the machine is making a turn without collision between the rear wheels or engine hood and the object, there occurs no collision of the restricting plate member against the object, and further even if the rear wheels or the engine hood should collide against the object, there will occur no damage to the restricting plate member.

If a pair of such restricting plate members are mounted on the right/left sides, there can be obtained right-to-left symmetry in the respect of the outer appearance. However, even when one restricting plate member is mounted between one wheel to which side the discharging of the cut grass pieces tends to concentrate and the engine hood, the clogging of the engine hood can still be restricted and the working environment can still be improved.

Downwardly of the restricting unit and to the lateral outer face of the machine body main frame, a rectifier plate may be attached. In this, the rectifier plate, preferably, includes a collision face for directing collided cut grass pieces to the lateral outer side. Some of the cut grass pieces discharged rearward from the rear end opening of the mower unit and passed the along the inner side of the right or left wheel to be discharged to the rear side may collide against the inner portion of the wheel and bounce back therefrom. While these pieces move rearward, they may move toward the right/left center of the traveling machine body, so that they may directly enter the inside of the engine hood or move along the outer surface of the engine hood, thus increasing clogging of the engine hood. With the above-described arrangement, however, such cut grass pieces that have collided against the inner side of the wheel and bounced back therefrom will be guided by the rectifier plate and directed again to the outer side of the traveling machine body to be appropriately discharged. Accordingly, it is possible to minimize the occurrence of intrusion of cut grass pieces to the inside of the engine hood or their moving up along the outer surface of the engine hood to cause clogging of the engine hood.

DETAILED DESCRIPTION OF THE PREFERRED EMBODIMENTS

[General Construction of Riding Type Grass Mower]

Figure 1:
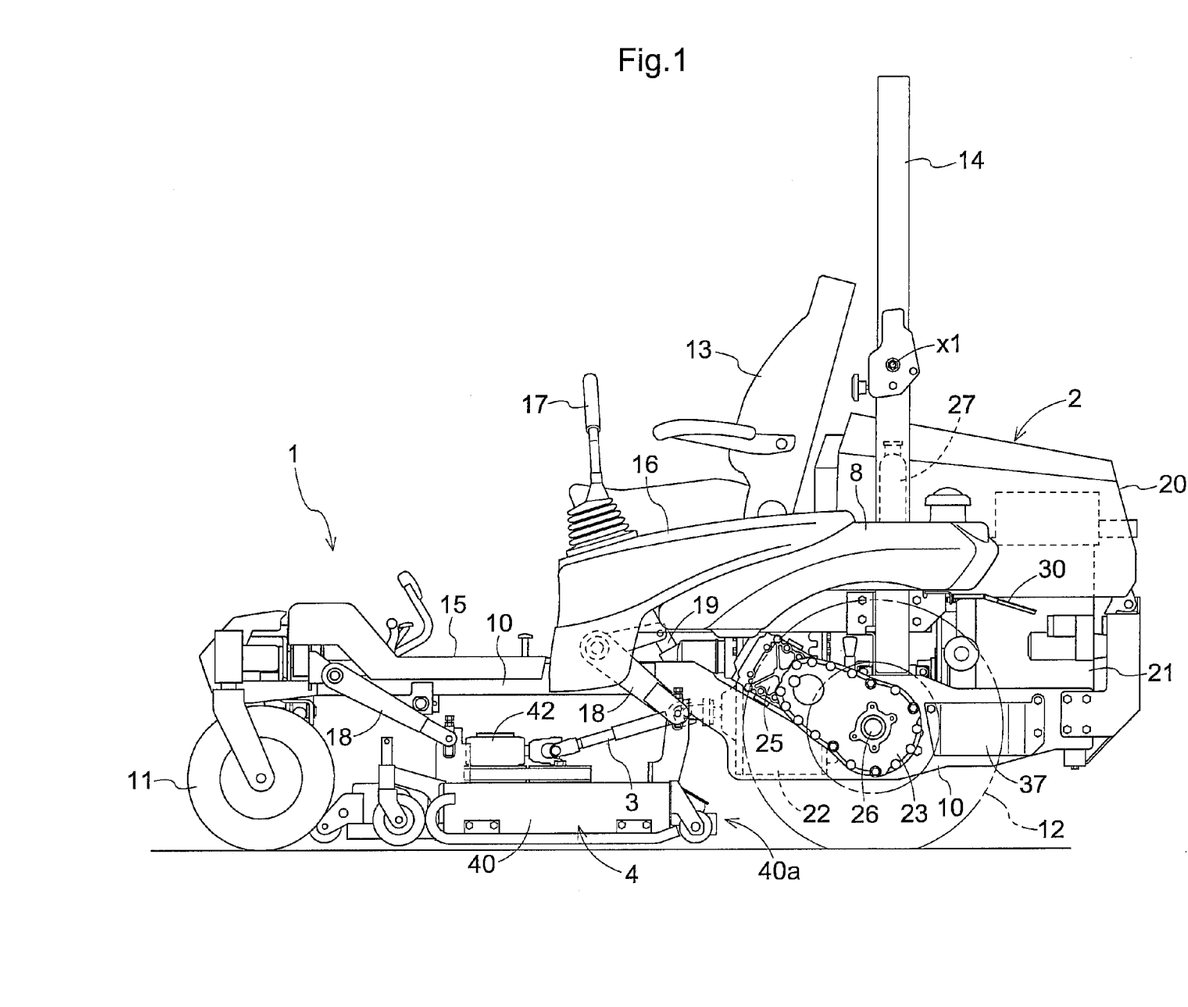
FIG. 1 is an overall side view of a riding type grass mower.
Figure 2:
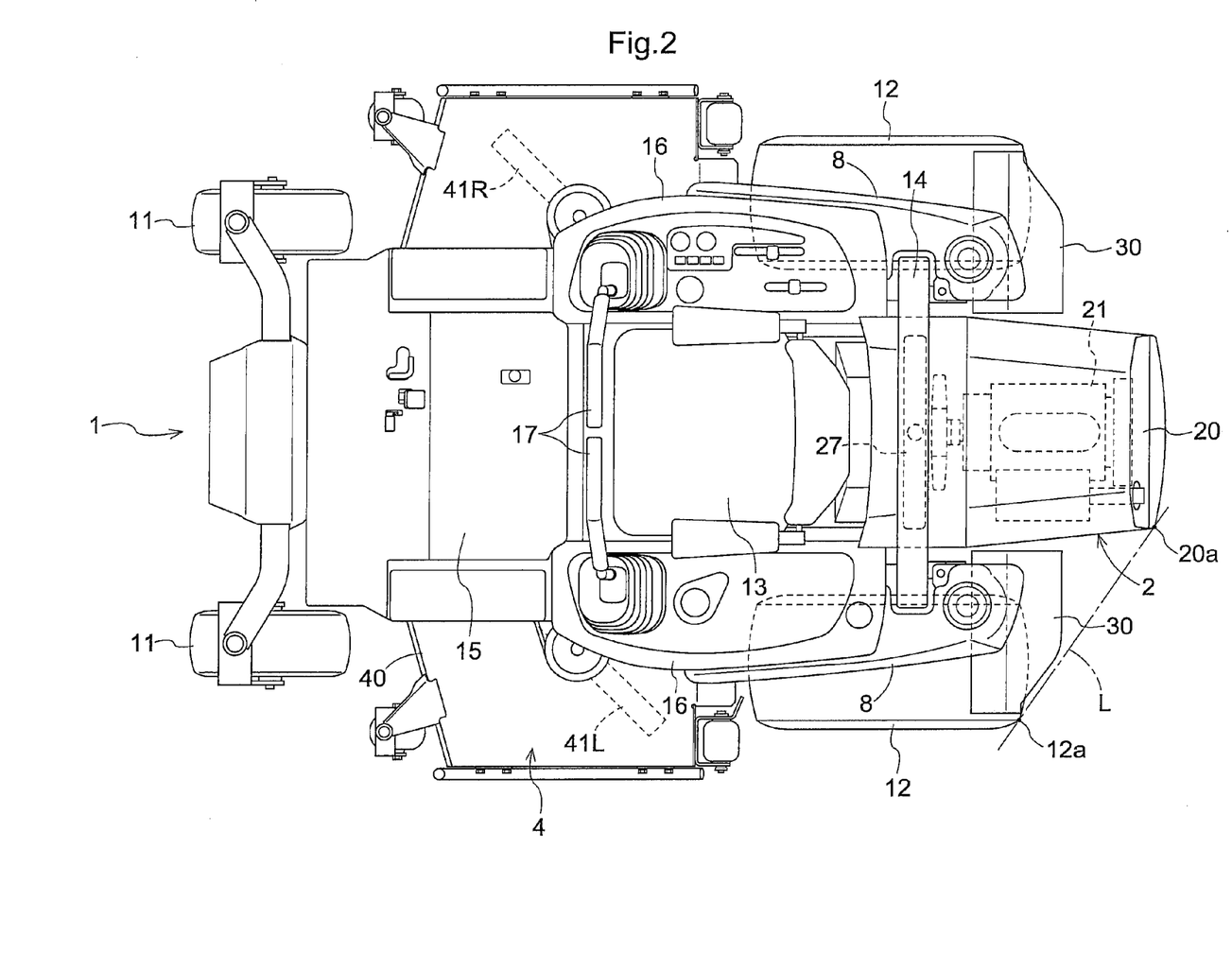
FIG. 2 is an overall plan view of the riding type grass mower.

FIG. 1 shows an overall side view of a riding type grass mower relating to the present invention and FIG. 2 shows its overall plan view. In this riding type grass mower, a traveling machine body 1 includes a pair of right/left front wheels 11 configured as caster type free wheels mounted at front end portions of a machine body main frame 10 and a pair of right/left rear wheels 12 mounted at rear end portions of the machine body main frame 10, and forwardly of the rear wheels 12 of this traveling machine body 1, that is, between the right/left front wheels 11 and the right/left rear wheels 12, a mower unit 4 is suspended and supported to be liftable up/down. Thus, the mower is constructed as the so-called mid-mount type mower.

At a rear portion of the traveling machine body 1, an engine section 2 is mounted to a rear frame portion of the machine body main frame 10. The engine section 2 includes a water-cooled engine 21 and a radiator 27 both of which are accommodated within a space surrounded by an engine hood 20. A driver's seat 13 is provided at a front/rear intermediate portion of the traveling machine body 1 forwardly of the right/left rear wheels 12 and upwardly between these right/left rear wheels. And, the engine hood 20 is disposed rearwardly of the driver's seat 13.

Rearwardly of the driver's seat 13, a portal-shaped ROPS (Rollover Protection Structure) 14 is fixed erect substantially perpendicularly. The ROPS 14 is foldable rearward at its vertically intermediate portion about a pivot (×1). The ROPS 14 can be folded during a grass cutting operation to be carried out nearby trunks of trees, so that the cutting operation can proceed smoothly without inadvertent hooking of the ROPS 14 to projecting branches of the trees.

At a front frame portion of the machine body main frame 10, there is attached a step 15 located adjacent the feet of the driver when seated in the driver's seat 13. On the right/left sides of the driver's seat 13, there are provided fenders 16. Each fender 16, as seen in the side view (see FIGS. 1 and 3), extends from the vicinity of the front end of the driver's seat 13 to a front/rear intermediate portion of the rear wheel 12. Under the right/left fenders 16, there are mounted a pair of fuel tanks 8. Each fuel tank 8 has a front/rear length from a position rearwardly of the front end of the fender 16 and forwardly of the front end of the rear wheel 12 to a position nearby the rear end of the rear wheel 12 and this tank 8 is disposed immediately above the rear wheel 12, so that the fuel tank 8 acts substantially as a "fender".

A pair of upper frames 7 are provided for supporting the driver's seat 13, etc. Each upper frame 7 extends from a position slightly rearwardly of the front end of the fender 16 on the inner side of the right/left fuel tank 8 to a position slightly rearwardly of the rear end of the ROPS 14. The upper frames 7 are supported to the machine body main frame 10.

The construction of the transmission line is of the well-known type, so detailed discussion thereof will be omitted. Referring only briefly thereto, an output from the engine 21 is inputted to a transmission case 22 to be divided into a traveling line and a PTO (implement driving) line. The traveling line power is inputted to a pair of right/left hydrostatic stepless speed changers (HST) 25 disposed on the right/left opposed sides of the transmission case 22 and a speed-changed output therefrom is transmitted to the right/left rear wheels 12 through right/left axle cases 23.

The HSTs 25 are attached to opposed lateral faces of the transmission case 22 and to lateral outer faces of the right/left HSTs 25, the axle cases 23 are attached via hydraulic blocks 28, respectively. The inside oriented face of each axle case 23 oriented toward the transmission case 22 is attached and fixed to the machine body main frame 10 via the hydraulic block 28.

The HSTs 25 for driving the right/left rear wheels 12 are configured to speed change steplessly to the forward/reverse side by separate and individual pivotal operations of a pair of right/left traveling levers 17 provided on the right/left sides of the driver's seat 13 and pivotable to the forward/rearward side. More particularly, from the neutral positions thereof shown in FIG. 1, if the right/left traveling levers 17 are operated together at one time and in a same direction, there is provided a forward/reverse traveling. If the right/left levers are operated differently from each other, there is provided a pivot turn or a spin turn.

[Construction of Mower Unit]

The mower unit 4 is configured to be suspended and supported via a four-link linkage mechanism 18. The linkage mechanism 18, as shown in FIG. 1 and FIG. 3, is operated up/down by an expanding/contracting operation of a hydraulic cylinder 19 connected to a portion of this mechanism 18, thereby to lift up/down the mower unit 4 substantially parallel to the ground.

Referring to the power transmission to this mower unit 4, the PTO power taken off at the transmission case 22 is transmitted to the front side of the machine body via a PTO shaft 24, which is an output shaft extending from the traveling machine body 1 and which projects from the front face lower portion of the transmission case 22 and via this PTO shaft 24 and the transmission shaft 3, the engine power is transmitted to the mower unit 4.

Referring to the construction of the mower unit 4, within a mower deck 40 which is open in its underside, there are mounted and supported three rotary blades 41L, 41C, 41R rotatably driven about respective vertical axes, the blades being arranged in a triangular layout as seen in the plan view, with the center rotary blade 41C being slightly offset to the forward side. The mower unit 4 is configured such that when the traveling machine body 1 effects straight traveling, due to partial overlap between right/left ends of rotary paths of the leading ends of adjacent rotary blades 41L, 41C, 41R, a grass cutting operation without omission of grass cutting is made possible.

Figure 3:
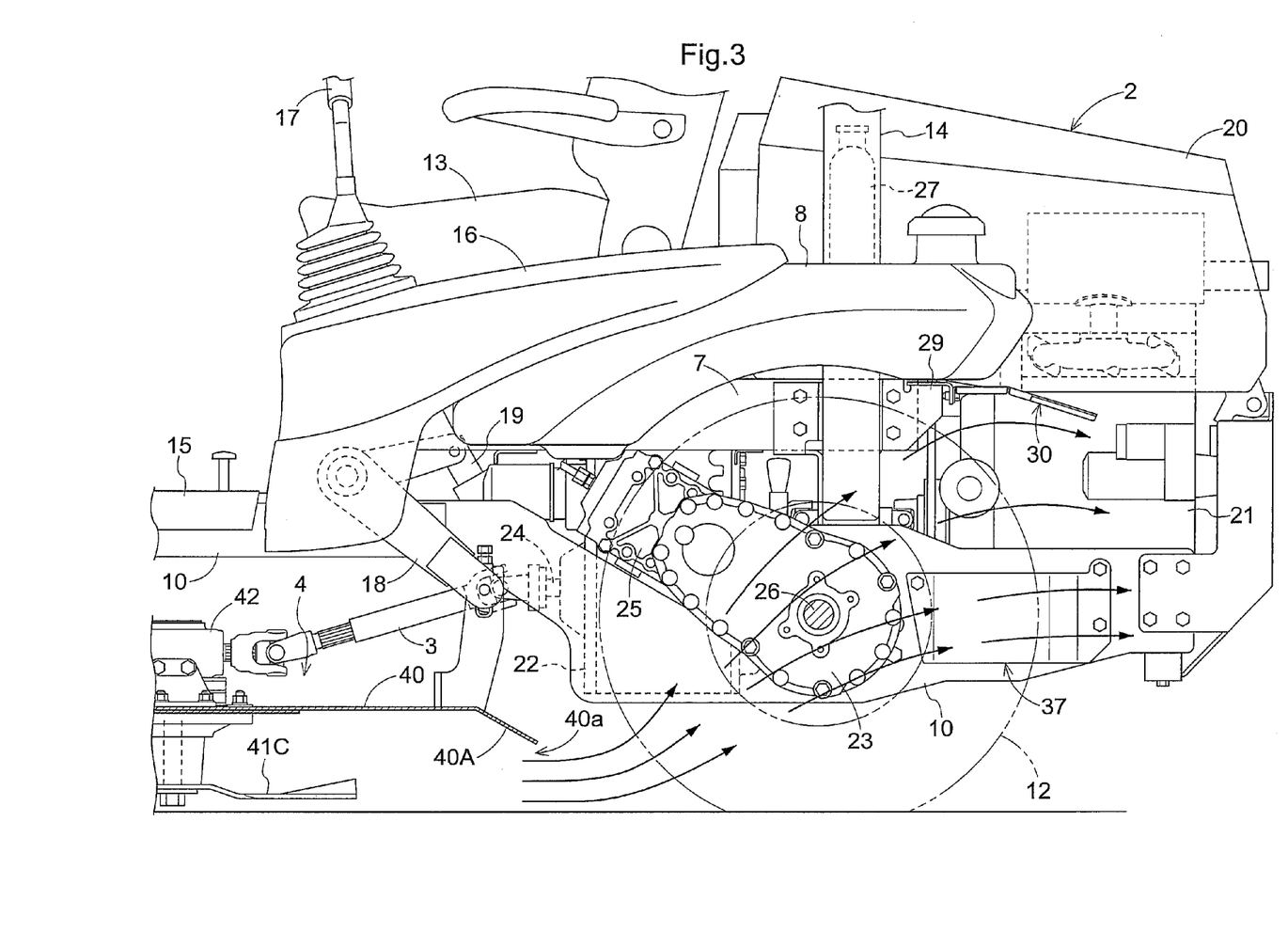
FIG. 3 is a side view in partial vertical section showing constructions of a mower unit and a structure rearwardly of the mower unit of the riding type grass mower and showing also a restricting plate member and a rectifier plate.
Figure 4:
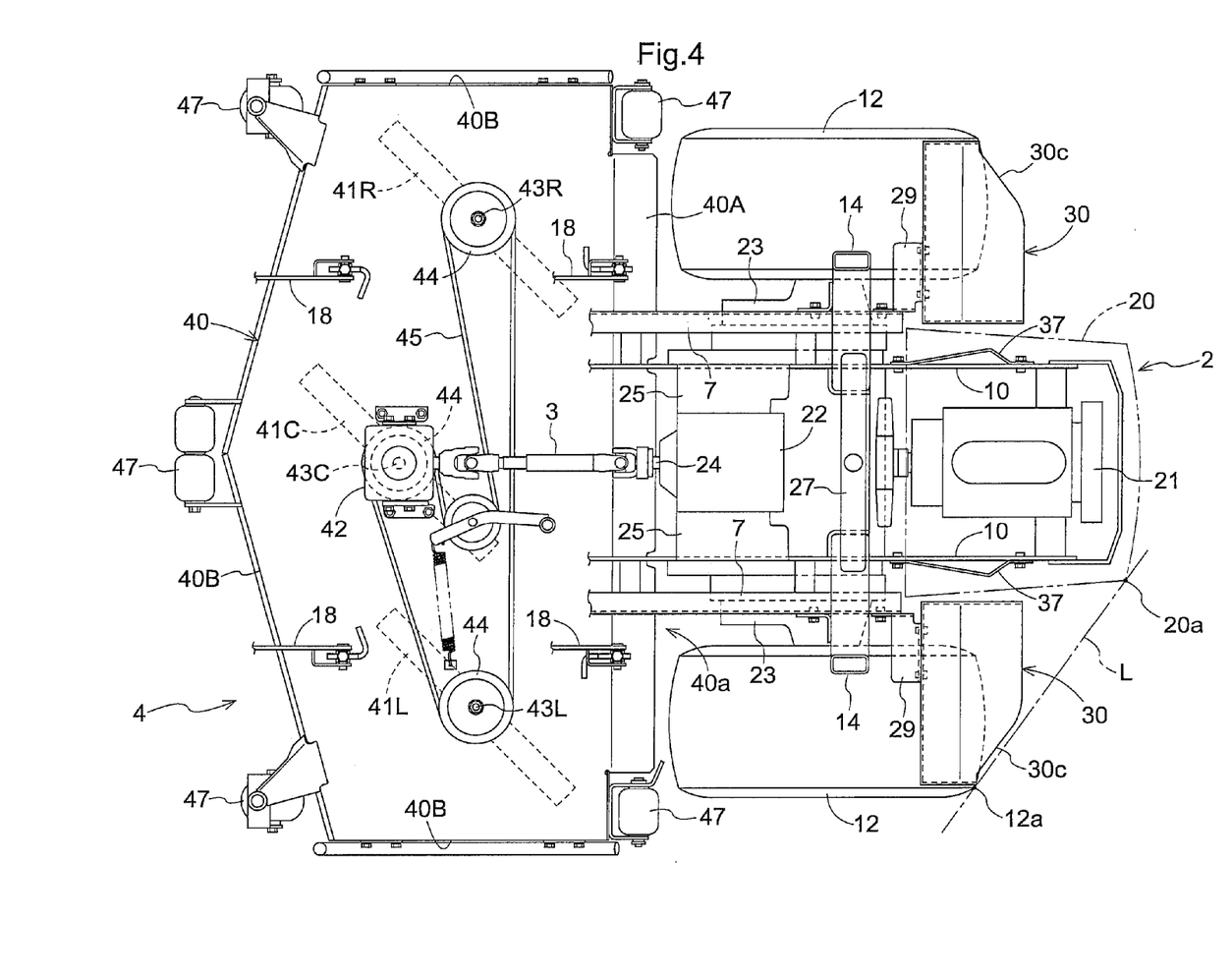
FIG. 4 is a partially broken plan view showing constructions of the mower unit and the structure rearwardly of the mower unit of the riding type grass mower and showing also the restricting plate member and the rectifier plate.
Figure 5:
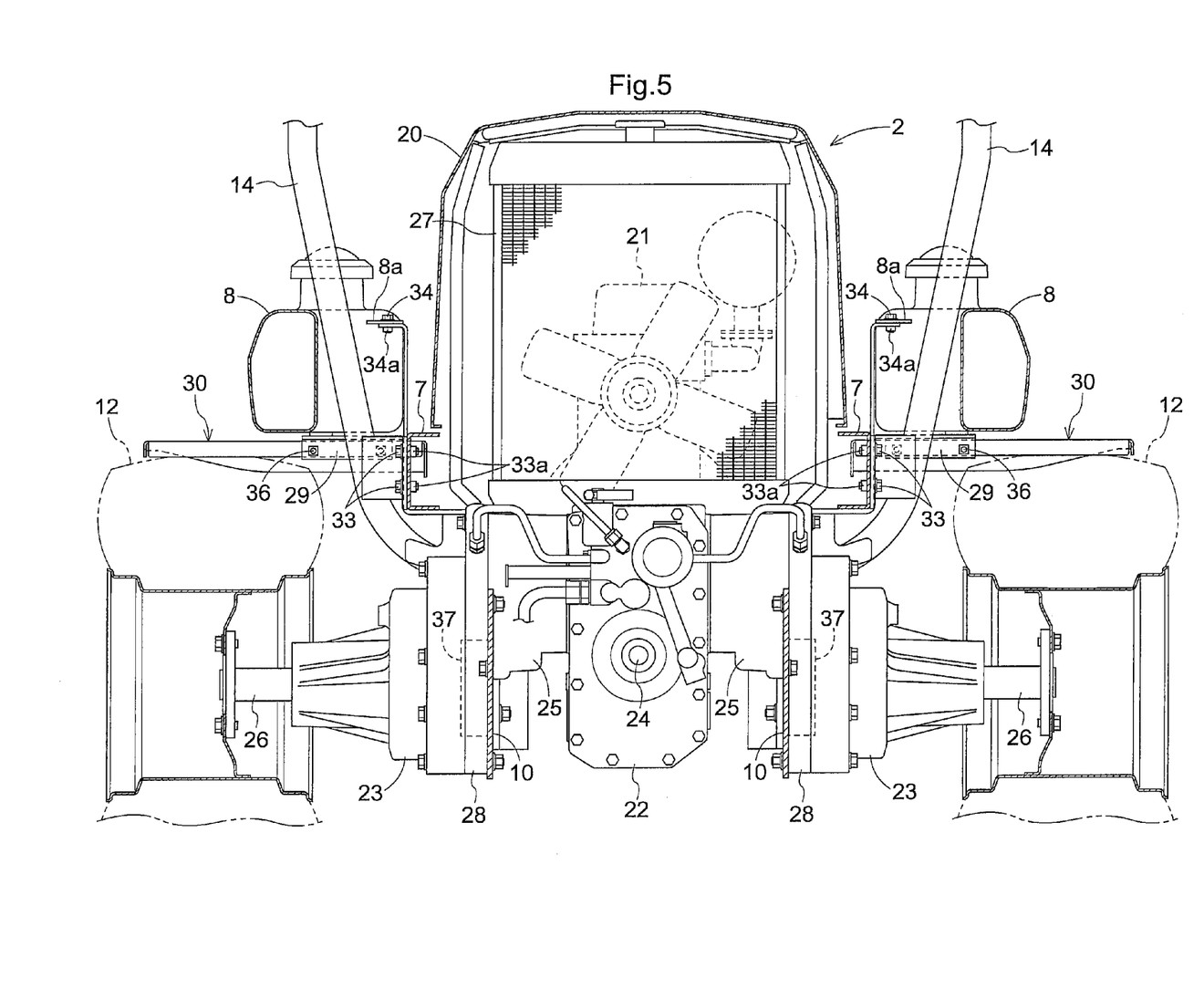
FIG. 5 is a front view in partial vertical section of the riding type grass mower showing the layouts of the restricting plate member and the rectifier plate.

As shown in FIG. 3 and FIG. 4, the mower deck 40 is constructed as a flat deck with the level of its top plate remaining same throughout. At a center position of the upper surface of this mower deck 40, there is mounted a bevel gear case 42 which receives the PTO power taken off by the PTO shaft 24.

In this bevel gear case 42, a rotational force in the horizontal direction transmitted via the transmission shaft 3 is converted into a vertical shaft rotational force through a bevel gear mechanism (not shown) provided therein and this resultant force is transmitted to a rotary shaft 43C of the center rotary blade 41C.

The center rotary shaft 43C and rotary shafts 43L, 43R of the left and right rotary blades 41L, 41R are operably coupled to each other via a length of belt 45 entrained around transmission pulleys 44, 44, 44 mounted at the terminal ends of the respective shafts, so that the respective rotary blades 41L, 41C, 41R are rotatably driven in a same direction (clockwise in the plan view) and at an equal speed.

In the periphery of the mower deck 40, there are provided obstacle-riding over (anti scalp) rollers 47. In operation, when the mower unit 4 suspended from and supported to the linkage mechanism 18 with upward movable play approaches an inclined ground surface, a bump or the like, any one or more of the free wheels 47 ride over the bump or the like, whereby the mower unit 4 is lifted up relatively, thus preventing the mower deck 40 from directly contacting and "scalping" the ground surface.

As shown in FIG. 3 and FIG. 4, the mower deck 40 per se has a cut grass shredding space formed by vertically oriented walls 40B extending from the front end to the opposed lateral ends thereof in cooperation with the rotary blades 41L, 41C, 41C and includes also a rear end inclined wall 40B which is rearwardly oriented obliquely downward. As a lower end position of the rear end inclined wall 40A is located upwardly of the vertically oriented wall 40B, a rear end opening 40a is formed downwardly of the lower end of the rear end inclined wall 40A. Thus, the mower unit 4 is constructed as a rear-discharge type configured to discharge cut grass from this rear end opening 40a.

As shown in FIGS. 3-6, a bracket 29 is attached to the rear end of each upper frame 7 and a rear portion of the fuel tank 8 is supported to this bracket 29 via a bracket 8a. And, there is also attached a restricting unit 30 having a restricting face (including a mesh face) 30A for restricting soaring of cut grass pieces after being discharged rearward from the rear end opening 40a of the mower unit 4. The restricting units 30 are located rearwardly of the driver's seat 13 and at the right/left lateral portions of the engine hood 20 downwardly of this engine hood 20. More particularly, in this embodiment, the restricting units 30 are formed of restricting plate members provided as two cut-grass soaring preventing members having the restricting faces 30A as the inner faces thereof.

Figure 6:
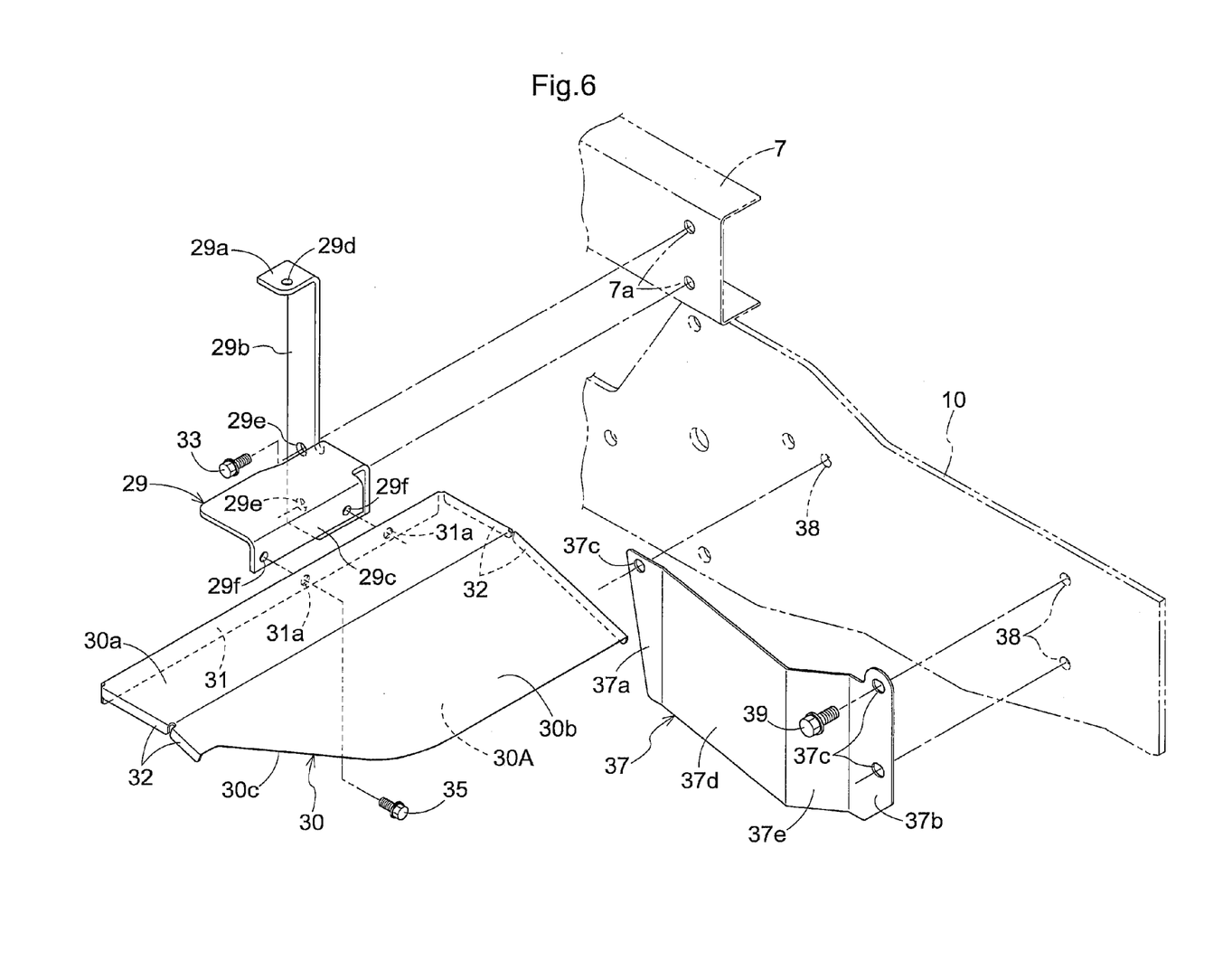
FIG. 6 is an exploded perspective view showing mounting constructions of the restricting plate and the rectifier plate.

The upper frame 7 defines, at the rear end portion thereof, two upper/lower bolt holes 7a. The bracket 29 includes a raised piece 29b having an upper end portion 29a bent horizontally therefrom and a downwardly bent piece 29c. The raised piece 29b defines one bolt hole 29d at the upper end portion thereof and defines also two bolt holes 29e at the lower portion thereof, whereas the downwardly bent piece 29c defines two bolt holes 29f.

The restricting plate member 30 forms bent pieces 31, 32 at the front end and right/left ends thereof and in the front end bent piece 31, two bolt holes 31a are defined.

Bolts 33 are inserted into the two bolt holes 7a defined in the upper frame 7 and the two bolt holes 29e defined at the lower portion of the raised piece 29b and then fastened together with nuts 33a, whereby the bracket 29 is fixed to the upper frame 7. And, bolts 34 are inserted into the bolt hole 29d defined at the upper end portion 29a of the raised piece 29b and a hole (not shown) defined in the bracket 8a of the fuel tank 8, whereby the rear end of the fuel tank 8 is fixed.

Bolts 35 are inserted into the two holes 29f defined in the downwardly bent piece 29c of the bracket 29 and the two bolt holes 31a defined in the bent piece 31 at the front end of the restricting plate 30 and then fastened together with nuts 36, whereby the restricting plate 30 is attached to the upper frame 7 via the bracket 29.

The restricting plate 30 extends, in its fore-and-aft direction, from the rearward intermediate position rearwardly of an axle 26 of the rear wheel 12 to a position slightly rearwardly beyond the rear end of the rear wheel 12 as seen in the plan view. In the right/left direction thereof, the restricting plate 30 extends from the vicinity of the right/left outer end of the engine hood 20 to a position adjacent to the outer end outward of the right/left center of the rear wheel 12 and extends from the outer side of the engine hood 20 to the area above the rear wheel 12.

In the restricting plate member 30, its front portion 30a extends substantially horizontally along the entire inner/outer width thereof and the plate member 30 is inclined downward to the rear side from the front/rear intermediate portion to a rear portion 30b thereof.

The restricting plate member 30 includes a cutaway portion 30c formed by cutting away straight a rear outer peripheral portion of the restricting plate member 30 so that this restricting plate member 30 does not project rearwardly in the plan view beyond a rearward borderline L interconnecting the rear end portion 20a of the engine hood 20 and the rear end 12a of the one, right or left rear wheel 12. With this arrangement, while the restricting plate member 30 widely covers the rear end upper portion of the rear wheel 12, there occurs no collision of the restricting plate member 30 against an obstacle or object. And, even if the rear wheel 12 or the engine hood 20 should collide against an obstacle, there will occur no damage in the restricting plate member 30.

Downwardly of the restricting plate 30 and on the right/left lateral outer face of the machine body main frame 10, there is attached a rectifier plate 37 having a cut grass guiding face 37d which is located at an outer position on the rear side thereof.

A front side attaching portion 37a and a rear side attaching portion 37b of the rectifier plate 30 are located substantially in a same plane and bolt holes 37c are defined in these attaching portions 37a, 37b. From the front side attaching portion 37a, the cut grass guiding face 37d is formed with a gentle inclination extending outward to the rear side thereof, relative to the plane of the attaching portions 37a, 37b. A portion between the rear end of the cut grass guiding face 37d and the rear side attaching portion 37b is formed as a sharp inclined face 37e.

The rectifier plate 37 is disposed downwardly of the restricting plate 30 and the machine body main frame 10 defines bolt holes 38 at positions corresponding to the attaching positions of the rectifier plate 37. Then, as bolts 39 are inserted into the bolt holes 38 and the bolt holes 37c defined in the rectifier plate 30 and then fastened together with nuts, respectively, the rectifier plate 37 is attached to the lateral outer face of the machine body main frame 10.

Cut grass pieces discharged rearward from the rear end opening 40a of the mower unit 4 past between the right/left rear wheels 12 will collide against the inner portion of the rear wheel 12 and bounce back therefrom. Some of the cut grass pieces and/or soil dust that have passed the rear wheel 12 to the rear side and then passed the lateral side of the engine hood 20 to the outside will tend to soar above the ground. In this, such cut grass pieces or soil dust tending to soar are restricted from rising up by the restricting plate 30. As a result, clogging of the engine hood 20 and/or the radiator 27 can be restricted and subsequent falling of such cut grass pieces and soil dust onto the driver too will be restricted. Consequently, the working environment for the worker is improved and interference with the cooling function for the engine 21 can also be restricted. So, the cutting operation can proceed under a favorable condition for an extended period of time.

In addition, as the restricting plate member 30 is formed with the inclination with the rear portion thereof being located progressively lower toward the rear side thereof, the soaring phenomenon of the cut grass pieces or soil dust discharged rearward from the restricting plate member 30 can be further restricted. Consequently, the clogging of the engine hood 20 and the radiator 27 and deterioration of the working environment can be avoided even more effectively.

Further, as the rectifier plate 37 is attached to the right/left lateral outer face of the machine body main frame 10 downwardly of the restricting plate member 30, the cut grass pieces or the like that have collided against the inner side of the rear wheel 12 and bounced back therefrom will be guided by the rectifier plate 37 to be again discharged to the right/left outer side of the traveling machine body 1. Consequently, the occurrence of clogging of the engine hood 20 and the radiator 27 can be minimized.

Other Embodiments (1) In the principal embodiment described above, the restricting plate members 30 are provided on both the right/left sides. Instead, the plate member 30 can be provided only on either right or left side. Since the rotary blades 41C, 41L, 41R are rotated clockwise in the plan view, cut grass pieces will mostly be discharged from the front side to the left rear side. So, if the restricting plate members 30 are present on both the right/left sides, the cut grass pieces will unlikely reach the restricting plate member 30 disposed on the right side, but will primarily reach and act on the left restricting plate member 30. For this reason, in case the rotary blades 41C, 41L, 41R rotate clockwise, the right restricting plate member 30 may be omitted and the restricting plate member 30 may be provided on the left side only. Similarly, in case the rotary blades 41C, 41L, 41R rotate counterclockwise, the left restricting plate member 30 may be omitted and the restricting plate member 30 may be provided on the right side only.

(2) Similarly, the rectifier plate 37 may be provided on one of the right/left sides only.

(3) The restricting plate member 30 is not limited to the one having the different shapes between its front portion 30a and rear portion 30b. Instead, this member 30 can be formed of only a horizontal portion for instance, or only of an inclined portion. Moreover, its shape in the side view is not limited to the inclined or straight shape, but e.g. can be curved upwardly convex in the side view.

(4) The shape of the cutaway portion 30c is not limited to the straight cutaway shape, but it can be a curved cutaway shape. Further, as the cutaway portion 30c is not essential, this portion can be omitted at all.

The present invention is applicable not only to the riding grass mower of the mid-mount type, but is applicable also to the front-mount type riding grass mower.

What is claimed is:

1. A riding type grass mower comprising:
   a pair of right and left main frames;
   a right rear wheel and a left rear wheel;
   a rear-discharge type mower unit disposed forwardly of the right and left rear wheels;
   a driver's seat disposed between and upwardly of the right and left rear wheels;
   a pair of right and left fenders disposed on right and left sides of the driver's seat, respectively;
   an engine mounted rearwardly of the driver's seat, the engine being disposed between respective rear portions of the right and left main frames;
   and
   a restricting unit having a restricting face configured to restrict upward rising of cut grass discharged from the mower unit, wherein the restricting face is disposed rearwardly of the driver's seat and extends in a transverse direction of the mower from a lateral side of the rear portion of the main frame associated therewith to an outer side of the rear wheel associated therewith, and covers a portion of the rear wheel extending rearward from above the rear wheel, wherein said restricting face of the restricting unit comprises at least one restricting plate member mounted to the mower below the fender associated therewith.

2. The riding type grass mower according to claim 1, wherein the restricting plate member includes a front portion having a horizontal face and a rear portion having an inclined face that is downwardly inclined to the rear side.

3. The riding type grass mower according to claim 1, wherein the right and left rear wheels are right and left rear drive wheels; and a rear outer peripheral portion of the restricting plate member is cut away so that the restricting plate member does not project rearward from a rear borderline interconnecting a rear end of an engine hood and the outer rear ends of the rear drive wheels.

4. The riding type grass mower according to claim 1, wherein said restricting plate member(s) is/are mounted on either one or both of the right and left main frames.

5. The riding type grass mower according to claim 1, further comprising a rectifier plate attached downwardly of the restricting unit and to a lateral outer face of the main frame associated therewith;
   wherein said rectifier plate includes a collision face for directing collided cut grass pieces to the lateral outer side.

6. The riding type grass mower according to claim 1, further comprising:
   a pair of right and left upper frames for supporting the driver's seat, the upper frames being supported by the respective main frames; and an engine hood, the engine hood including an upper hood portion covering an upper face of the engine and side hood portions respectively covering right and left faces of the engine;

wherein the restricting unit is supported by the upper frame associated therewith, and the restricting face has a lateral inner edge thereof extending in opposition to a lower edge of the side hood portion associated therewith.

7. The riding type grass mower according to claim 6, further comprising a fuel tank disposed to interconnect the fender and the restricting unit associated therewith, the fuel tank extending above the rear wheel associated therewith in a fore/aft direction of the mower from a position forward of a front end of the rear wheel to a rear end region of the rear wheel.

* * * * *